Patented Dec. 22, 1942

2,305,859

UNITED STATES PATENT OFFICE 2,305,859

METHOD FOR PREPARING RESINOUS ARTICLES

Ernst Freund, New York, N. Y., assignor to Gemloid Corporation, Elmhurst, Long Island, N. Y., a corporation of New York No Drawing. Application April 19, 1940, Serial No. 330,474

7 Claims. (Cl. 18—47.5)

This invention relates to a method for improving the properties of or imparting new properties to shaped articles made from resinous materials and in its more specific application to a method of plasticising preformed resinous articles.

Thermoplastic and thermal-setting resins have found extensive use in the art of molded articles such as buttons, bottle caps, dolls, bracelets, receptacles, dishes, costume jewelry, knobs, handles, as well as innumerable other articles both large and small including transparent, translucent or opaque sheets. An important field of use for certain of the resins, specifically the vinyl and polyvinyl acetal resins, is that of laminated safety glass which has exposed sheets of glass held together by a thin transparent colorless layer or sheet of resin that firmly adheres to the glass to form a unitary sheet of great strength and resistance to shattering even at relatively low temperatures. Various methods have been proposed for working the resins into the desired articles which have been influenced by the final shape of the desired product. Such methods include casting, molding, spinning, sheeting, calendering, extrusion and the like, and are referred to generally herein as shaping or molding.

For many resins efforts to form shaped articles have not been successful because when the properties of the resin charge as a powder or dough were controlled to satisfy the conditions required for the shaping operation. The shaped articles produced had limited utility because of a predominance of undesirable qualities or a lack of essential properties. On the other hand where the resin charge has a composition which will produce the required properties in the final shaped article which usually means that the charge contains an amount of plasticizer sufficient to impart the desired properties to the finished article, it is usually not satisfactory for molding. That is, the properties necessary or desirable for working or molding the resinous material are not the same properties which are required in the finished article.

For example, formed articles with elastic, rubber-like properties are produced from a resin dough of polymerized polyvinyl compounds which contain the proper plasticizer as well as volatile solvents and diluents which are later evaporated. This dough is shaped by sheeting, extruding, calendering, etc., depending upon the form desired. The difficulties of such a process are known and have often been described in the literature. The dough containing the plasticizer solvents and diluents becomes sticky or tacky and lacks strength, making it difficult to handle during the first stages of the removal of the solvents. It tends to stick to the forming equipment. The desired smooth surface so necessary where such formed articles are intended as laminating sheets for safety glass is not readily obtained. Frequently, there is a formation of bubbles through the occlusion of air. There are other difficulties too. The plasticizer is often a nonsolvent or only a swelling agent for the resin and during the forming operation, especially if heat is used, there often occurs a "sweating" of the plasticizer. Furthermore, some plasticized resins are subject to deterioration by heat.

According to this invention, it is possible to prepare resinous compositions with the properties conducive to properly working the basic compositions and shaping the desired articles, then modify or supplement the original properties of the shaped articles.

It is accordingly an object of this invention to provide a process for the preparation of shaped articles from resinous materials by first adjusting the properties of the resinous composition to facilitate the shaping or molding of the desired article and then modifying the physical properties of such article or adding new properties thereto.

Another object of this invention is to improve or develop the properties of shaped articles, or to impart new properties to shaped resinous articles, however prepared.

A further object resides in providing the process of preparing shaped articles from synthetic resins comprising shaping a synthetic resinous material to form a relatively hard article, subjecting the shaped article to a swelling agent, introducing a plasticizer and removing the swelling agent to form an elastic article.

An important object is to provide a molded article of unplasticized resinous material the physical properties of which have been improved as to toughness and elasticity by a plasticizer introduced into the preshaped article. A special object is to provide a method for imparting elastic, rubber-like properties to preshaped articles.

With these and other objects in view, the invention will be described with reference to certain preferred embodiments as to composition and procedure which should be considered as illustrative of the invention and not in limitation thereof.

The principles of this invention are applicable to many different types and compositions of resins. With certain resins, the results achieved are greater than with others and the process has wide application.

Particularly outstanding results are obtained with the vinyl resins either from the polymerization of a single vinyl compound or from more than one as a copolymer. As is well known vinyl resins may be prepared by polymerizing vinyl chloride, vinyl acetate, or both, by exposure to light, the use of catalysts, etc. Instead of vinyl chloride other halides may be substituted and many vinyl esters are useful. Improved properties are found when mixtures of vinyl halides and vinyl esters are copolymerized. The solubility of these vinyl resins depends on their composition, method of preparation as well as other factors and usually where it is desired to form a solution of the resin as when casting sheets, a mixture of solvents or a solvent and diluent is preferably employed. Most vinyl resins are at least partially soluble in one or more of the following volatile or relatively volatile organic liquids: acetone, diacetone alcohol, ethylene dichloride, methyl or butyl alcohol, mono ethyl ether of ethylene glycol, propylene dichloride, methyl isobutyl ketone, dipropyl ketone, toluene, xylene, benzol, etc. The so-called solvents are volatile and fugitive and do not impart permanent properties to a resin but are useful only to assist in the preparation, application or use of the resin as in casting sheets.

Most resins having qualities conducive to use for forming shaped articles are per se too hard, horny, brittle and inelastic unless modified with a material known as a plasticizer which is compatible with the resin. When a plasticizer, or mixture of plasticizers, is incorporated in the resinous composition in an amount adequate to provide the desired strength and elastic properties required in the final article, a composition is obtained which is extremely difficult, if not impossible, to handle during molding to give a properly shaped article. This is particularly true where the plasticizer is one which gives a product the rubberlike property of elastic stretch.

In practicing this invention, the original resinous composition is prepared in suitable form. For injection molding, this is a powder. Other shaping processes require a resin dough. In either case, the resinous composition is prepared without a plasticizer or with only a limited amount of plasticizer. The molding composition may include in addition to the resin suitable fillers as, for example, clay, slate, barytes, red iron oxide, lamp black, and the like, with or without other materials serving primarily as pigments. There may be some residual solvent from steps in the preparation or working of the resin and a plasticizing agent may be present provided it is present in an amount which does not deleteriously affect the molding procedure and is not sufficient for imparting all of the properties to the extent required in the final shaped article. Resinous molding compositions of this type with insufficient plasticizer for the molded product even though containing some plasticizing agent are herein referred to as unplasticized.

Plasticizing agents which may be incorporated in the molding composition when it comprises a vinyl polymer or copolymer, polyvinyl acetal and the like, and which may also be used in a later step to be described, include such compounds as diethyl phthalate, dibutyl phthalate, tributyl and tricresyl phosphate, ethyl abietate, di (beta butoxy ethyl) phthalate, chlorinated aromatic hydrocarbons, diphenyl ether, esters of certain dicarboxylic acids including dimethyl adipate and dibutyl sebacate, higher esters of glycol or polyglycol, as well as others which are known to plasticize the resin or mixture of resins in the molding composition. The aforementioned plasticizers are in many instances useful with other resins that may be employed in practicing this invention such as acryl resins.

In practicing the invention, a suitable resinous molding composition is prepared. This may comprise a resin or mixture of resins, fillers, pigments or dyes with or without limited and insufficient amounts of one or more plasticizers. The physical form of the molding composition will be dictated by the type of molding operation to be performed, i. e., sheeting, extrusion, spinning, calendering, injection, or the like. For injection molding a powder is prepared and injected into the mold as such. The application of heat and pressure produces an article of predetermined shape, i. e., threads, handles, buttons, dolls, necklaces, etc., but the prepared article would be lacking in one or more physical properties necessary or desirable in a commercial article. The same would be true when forming fibres, filaments, threads, fabrics, sheets, rods, etc., by other shaping methods. To impart the desired properties and particularly elastic stretch, the unplasticized shaped or molded article is subjected to the treatment hereinafter described for incorporating a plasticizer which treatment may be conducted as a batch or continuous process.

The preshaped unplasticized article is first subjected to the action of a swelling agent. This swelling agent is preferably applied in liquid form by immersing the article but a similar effect may be obtained by exposing the preformed unplasticized article to the action of vapors of the swelling agent, care being taken not to heat the article excessively which might cause melting or solvent action by the swelling agent. The swelling agent may include a solvent for the resin and preferably a diluent. These may be selected from the list of solvents given above or other liquids known to be solvents for the resin involved. The ratio of solvent to non-solvent in the swelling agent should be such as to give a non-solvent mixture with a swelling action only. Gasoline, tetrahydronaphthalene, and carbon tetrachloride are non-solvents which have a swelling action on the various vinyl resins.

The action of the swelling agent is to make the article receptive to a non-solvent plasticizer. In practice, the two operations of subjecting the articles to the action of the swelling agent and the plasticizer are preferably combined by mixing or dissolving the plasticizer in the swelling agent. When this procedure is employed a relatively high concentration of plasticizer (from 15 to 50% of the total) is preferred thereby insuring the introduction of an adequate amount of the plasticizer into the resinous article. The swelling agent may serve as a vehicle for distributing a dye in the shaped article. To accomplish this, the dye is dissolved or dispersed in the swelling agent which may or may not contain the plasticizer.

It will be understood that the exact compositions of swelling agents and plasticizers selected as well as the time and temperature factors will vary according to the composition and physical characteristics of the shaped resinous articles. Furthermore, in practice it is preferred that the treatment with the swelling agent and the plasticizer either in one or two steps be carried out at low or room temperatures. Heating may and in some cases must be resorted to but is avoided wherever possible.

The treatment with the swelling agent may be divided into two or more steps with the same or different compositions or a swelling agent may be used alone followed by a mixture of a swelling retaining agent and a plasticizer.

After a sufficient amount of the plasticizer has been introduced and incorporated into the shaped resinous article, it is removed from the liquid and dried as by exposure to temperatures which will vaporize the residual swelling agent. Usually room temperatures are adequate and where commercially expedient the swelling agent may be recovered. When the swelling agent employed is one which is only slowly volatile at lower temperatures, it may be replaced or leached from the molded article with a more volatile liquid, that is, a non-solvent for both the resin and the plasticizer, which in turn is rapidly and readily removed.

The described treatment transforms the molded resinous article from a relatively hard, inelastic object to a tough and elastic product with new and improved desirable properties. When originally prepared, the article was sharply and uniformly molded free from voids or other irregularities. These desirable factors have not been lost by the subsequent treatment but are supplemented by the improved or new properties which have been added. An increase in dimensions will result from the action of the swelling agent and the incorporation of the plasticizer. The extent of this can be determined and suitable allowances made where exact dimensions are finally required.

The invention is illustrated in the following examples:

Example I

A molding powder was prepared from a copolymer of approximately 85% vinyl chloride and 15% vinyl acetate and molded in an injection molding machine which formed bracelets. The molded bracelets were brittle and inelastic. A liquid was prepared comprising 5 parts of gasoline, 3 parts of acetone and 4 parts of dibutyl sebacate. The bracelets were immersed in this liquid while it was at room temperature and kept there until the swelling action had ended. They were then removed and dried at room temperature to evaporate the gasoline acetone mixture. Tests showed that whereas the product from the injection mold was inelastic; the bracelets, after treatment with the swelling agent and plasticizer, were flexible, tough, elastic and rubberlike, readily withstanding substantial deformation without breaking.

Example II

An unplasticized copolymer of vinylchloride and vinyl acetate, capable of assuming elastic and rubberlike properties when suitable plasticizers in a sufficient amount are incorporated, was formed into sheets of .020" thickness by calendering and the sheets immersed in a tank containing a mixture of 1 part dibutylphthalate, 3 parts dibutylsebacate, 4 parts acetone and 7 parts gasoline. The duration of this treatment was 24 hours. A space was left between the sheets to allow the liquid to circulate over all surfaces of the sheets. After this treatment, the adherent liquid was removed and the swollen sheets dried at medium temperatures. After evaporating the swelling agents, the thickness of the sheet was .023". The treated sheets have elastic stretch and rubber-like properties and are useful for many purposes but particularly as the interlayer for safety glass.

To produce polished surfaces, the sheets may be subjected to heat and the pressure of highly polished plates. After the incorporation of the plasticizer, the product is transparent and homogeneous with elastic stretch. Other plasticizers may produce products which are not clear and transparent but are useful for many purposes. Naturally, the resin selected as well as the combination of resin and plasticizer influence the properties of the final shaped article.

Example III

A copolymer with the properties described in Example I was dissolved in volatile solvent from which solution fibres were spun. The spinning itself was by the so-called dry spinning process with spinning machines similar to those used in the acetate silk process. During or after the spinning process the fibres may have been stretched. The fibres were given elastic and rubber-like properties by immersion in a bath containing 5 parts gasoline, 2.2 parts acetone, 0.5 part diamylphthalate, 3 parts dibutylsebacate. The duration of the treatment is dependent upon the size of the fibres varying between 2 and 8 hours. Then the threads were freed from the adherent liquid by centrifuging and afterwards dried. Each phase of this process can be effected under tension of the fibres to avoid a shrinking of the fibres during this treatment.

Example IV

A polyvinylacetalresin containing

| | Per cent |
|---|---|
| Butyralaldehyde combined as polyvinylacetal | 80 |
| Ester as polyvinylacetate | 4 |
| Alcohol as polyvinylalcohol | 16 | was formed into a relatively hard sheet by calendering the heated resin or in any other usual manner. The sheets were immersed in a tank containing 5 parts gasoline, 2 parts toluol, 1 part acetone, and 4 parts of a plasticizer composed of a high ester of glycol. After 18 hours treatment, the sheets were taken from the tank, the adherent liquid removed and, thereafter, the swelling agents evaporated by drying at medium temperatures.

Certain specific resins have been set forth above but it will be evident that the process is applicable to many different resins varying as to composition, proportion, and methods of preparation. The preferred general class of resins is that identified as vinyl and more particularly the partial polyvinyl acetal resin. With these latter resins, esters of phthalic acid, toluene sulfonamides, higher esters of glycols and polyglycols, straight chain dicarboxylic acids having at least four methylene groups and the like are suitable plasticizers to impart elastic properties. The invention is also applicable to the so-called synthetic rubbers, polymerized diolefines such as butadiene, isoprene, chloroprenes, etc.

The time of treatment with the plasticizer and the amount incorporated may be varied as desired. Best results have been obtained where the final product contained 40% as much plasticizer as resin but this amount varies according to the properties required and the components involved, and useful products have been made where the plasticizer was as low as 15% as well as above 50%. Solvent type plasticizers used alone do not give products with elastic stretch and increasing the proportion of plasticizer serves generally to give only a tacky product. In addition to non-solvent plasticizers alone, mixtures of solvent and non-solvent plasticizers may be employed in various proportions.

The procedure herein described has been applied to many products molded in various ways and the marked improvements in the physical properties of the final products have been uniformly observed.

Having thus described my invention with reference to certain underlying principles and illustrated by some of the preferred embodiments,

I claim:

1. The process for preparing shaped articles from vinyl resins comprising shaping a vinyl resin when substantially free of any plasticizer to form a relatively hard article, subjecting the shaped article to a swelling agent, treating the shaped article while swollen with a non-solvent fluid plasticizer for the vinyl resin and removing the swelling agent to form an elastic article without subsequently reshaping the article after adding the plasticizer.

2. The process for preparing shaped articles from copolymer vinyl resin when substantially free of any plasticizer comprising shaping a copolymer vinyl resin to form a relatively hard article, subjecting the shaped article to a swelling agent, treating the shaped article while swollen with a non-solvent fluid plasticizer for the copolymer vinyl resin and removing the swelling agent to form an elastic article without subsequently reshaping the article after adding the plasticizer.

3. The process for preparing shaped articles from copolymerized vinyl chloracetate resins initially free of any plasticizer comprising molding the copolymer molding powder by injection molding, subjecting the molded article to the combined and simultaneous action of a swelling agent and a non-solvent dissolved plasticizer and removing the swelling agent to form a finished elastic article.

4. The process for preparing shaped articles from unplasticized polyvinyl acetal resin comprising working said resin to form a shaped article, subjecting the shaped article to the action of a swelling agent and to a mixture of solvent and non-solvent plasticizers to produce a finished article in elastic form, and then removing the swelling agent.

5. The process for preparing shaped articles from unplasticized polyvinyl acetal resin comprising working said resin to form a shaped article, subjecting the shaped article to the action of a swelling agent and a plasticizer nonsolvent to the resin, to produce an elastic article without necessity of any reshaping of the same, and then removing the swelling agent.

6. The method for improving the physical properties of a molded article without any reshaping of the same and composed of unplasticized copolymerized vinyl halide and vinyl ester which comprises subjecting the molded article to the action of a swelling agent and treating the shaped article while swollen with a non-solvent fluid plasticizer, then removing the swelling agent to form an elastic article.

7. The method for improving the physical properties of a molded article without any reshaping of the same and composed of unplasticized copolymerized vinyl chloride and vinyl ester which comprises immersing the molded article in a mixture of gasoline, toluene and dibutyl sebacate until the swelling action of the gasoline ceases, then vaporizing the gasoline and the toluene.

ERNST FREUND.